(12) United States Patent
Bruns

(10) Patent No.: US 7,086,815 B2
(45) Date of Patent: Aug. 8, 2006

(54) LASHING DEVICE FOR TYING A LOAD IN A TRANSPORT CONVEYANCE

(75) Inventor: Johannes Bruns, Gehlenberg (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/859,437

(22) Filed: Jun. 1, 2004

(65) Prior Publication Data

US 2004/0265087 A1 Dec. 30, 2004

(30) Foreign Application Priority Data

May 30, 2003 (DE) ................. 103 24 650

(51) Int. Cl.
*B61D 45/00* (2006.01)
(52) U.S. Cl. .................................... 410/107
(58) Field of Classification Search ................ 410/101, 410/102, 104–107, 116; 24/265 CD, 115 K; 248/449
See application file for complete search history.

(56) References Cited

U.S. PATENT DOCUMENTS

| 3,693,920 | A | | 9/1972 | Trautman |
| 3,888,190 | A | | 6/1975 | Biggs |
| 4,493,470 | A | | 1/1985 | Engel |
| 4,715,754 | A | | 12/1987 | Scully |
| 4,741,653 | A | | 5/1988 | Schmidt et al. |
| 4,850,769 | A | | 7/1989 | Matthews |
| 4,907,921 | A | | 3/1990 | Akright |
| 5,076,745 | A | | 12/1991 | Klein |
| 5,112,173 | A | | 5/1992 | Eilenstein et al. |
| 5,234,297 | A | | 8/1993 | Wieck et al. |
| 6,030,159 | A | | 2/2000 | Herrick et al. |
| 6,138,975 | A | * | 10/2000 | McDaid ...................... 248/499 |
| 6,374,466 | B1 | * | 4/2002 | Macias ..................... 24/132 R |
| 6,533,512 | B1 | * | 3/2003 | Lin ............................ 410/102 |
| 2002/0168242 | A1 | | 11/2002 | Lin |
| 2004/0258498 | A1 | | 12/2004 | Bruns |
| 2004/0265088 | A1 | | 12/2004 | Borrmann et al. |

FOREIGN PATENT DOCUMENTS

| DE | 2161735 | 7/1972 |
| DE | 3943077 | 7/1991 |
| DE | 4102274 | 1/1992 |
| EP | 0894713 | 2/1999 |

\* cited by examiner

*Primary Examiner*—H Gutman
(74) *Attorney, Agent, or Firm*—W. F. Fasse; W. G. Fasse

(57) ABSTRACT

A lashing device having a base and a lashing bail journaled to the base is constructed for attachment to a lashing channel mounted on or in a loading floor of a transport conveyance such as an aircraft. The base includes a socket for mounting an interconnecting element to the lashing device when the lashing bail is tilted into an inoperative position. Thus, the switch-over between using the latching bail or the interconnecting element or vice versa is quickly accomplished.

18 Claims, 6 Drawing Sheets

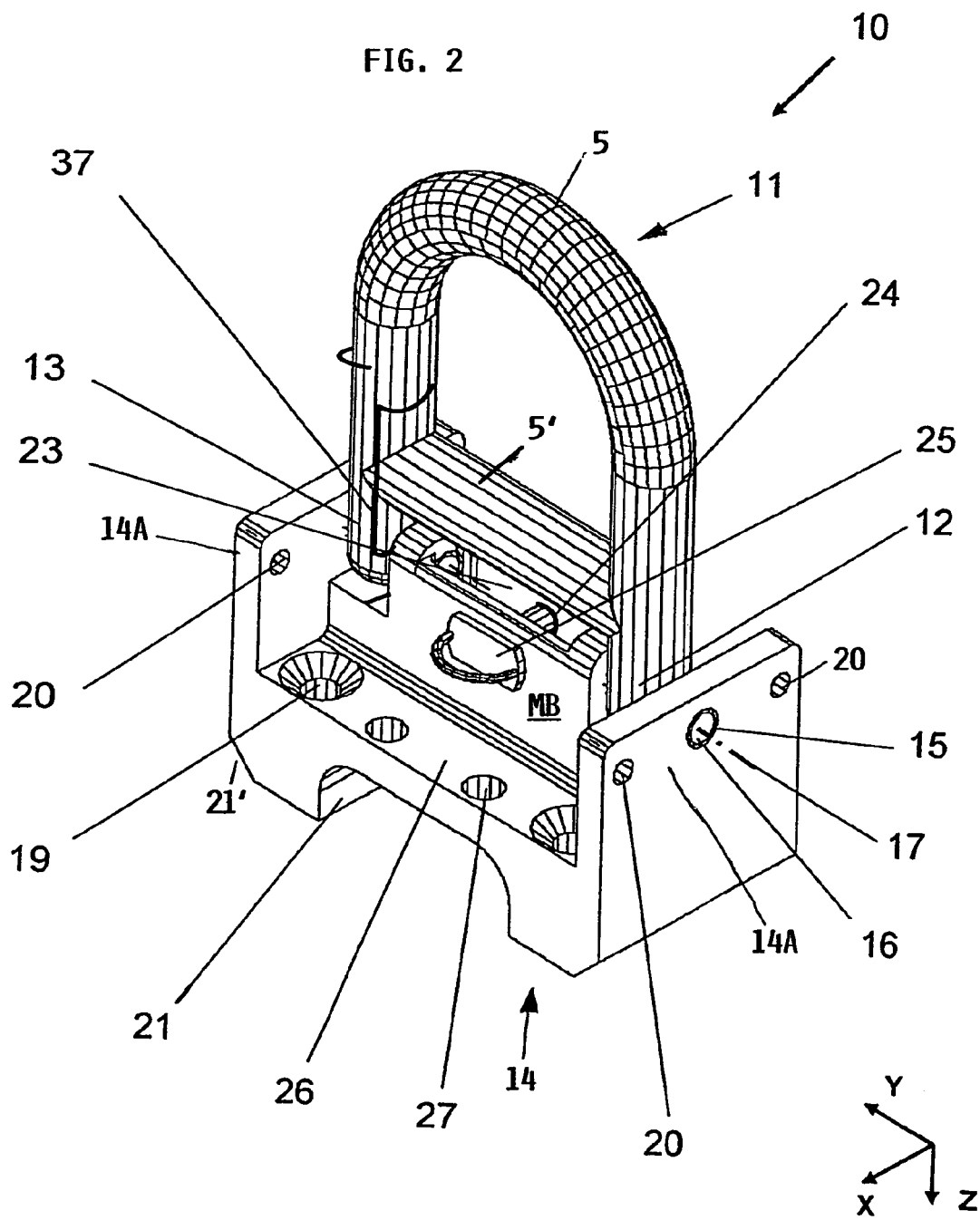

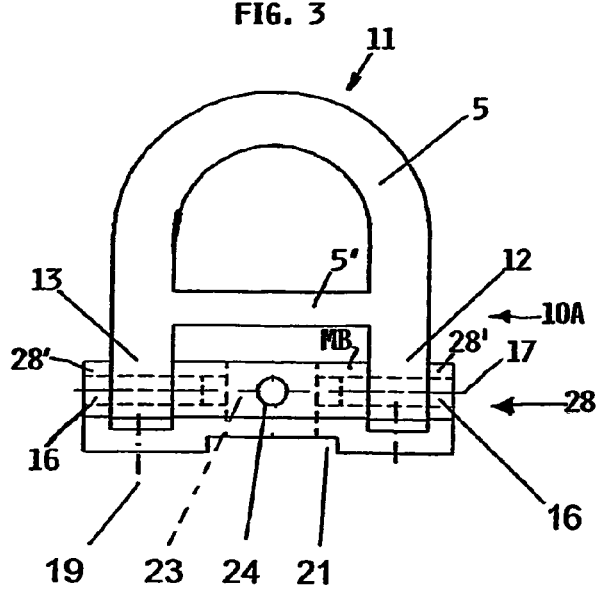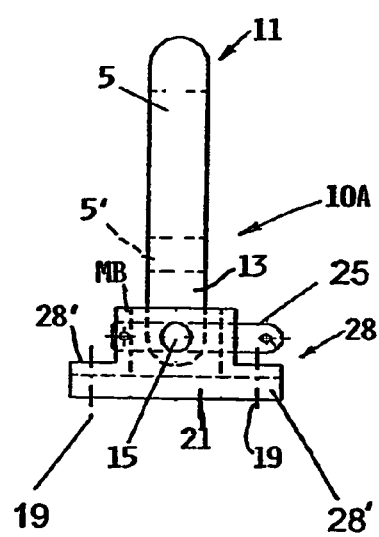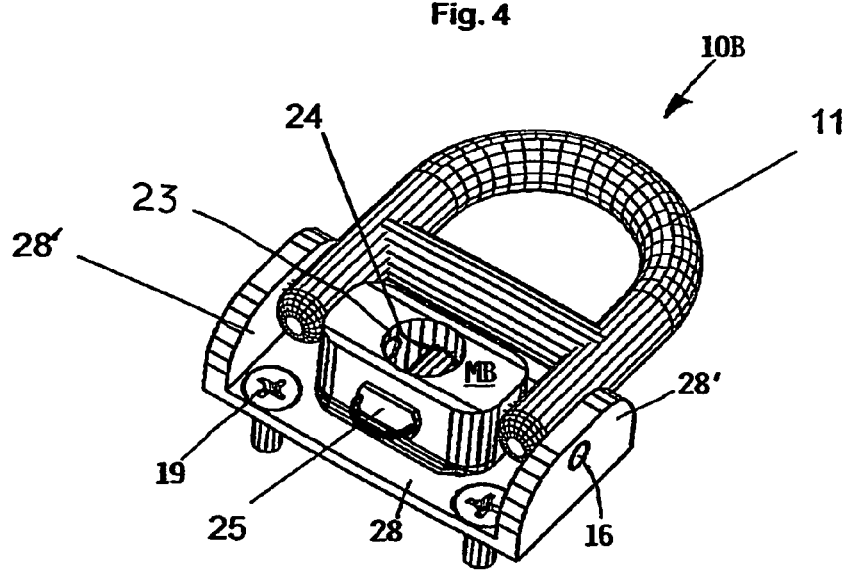

LASHING DEVICE FOR TYING A LOAD IN A TRANSPORT CONVEYANCE

CROSS-REFERENCE TO RELATED APPLICATIONS

The present application is related to U.S. application Ser. Nos. 10/859,440 and 10/859,443, both filed on Jun. 1, 2004.

PRIORITY CLAIM

This application is based on and claims the priority under 35 U.S.C. §119 of German Patent Application 103 24 650.9, filed on May 30, 2003, the entire disclosure of which is incorporated herein by reference.

FIELD OF THE INVENTION

The invention relates to a lashing device for tying or securing a load to a loading floor in a transport conveyance, particularly in an aircraft. A load includes any type of goods or freight items and seats for passengers.

BACKGROUND INFORMATION

Transport conveyances such as aircraft are used for conveying freight as well as passengers. The same aircraft may, for example, operate during daytime as a passenger aircraft and as a freight conveyance during the night. For this purpose it is necessary that the change-over from a passenger aircraft to a freight conveyance and vice versa can be rapidly performed to assure the proper latching or lashing of freight items including the mounting and demounting of passenger seats. Thus, the freight loading systems must be constructed for a rapid change-over to be adaptable to different requirements.

Moreover, the freight items to be transported may have the most varied features. For example, standardized containers and pallets as well as unstandardized freight items must be transported. Unstandardized freight items include, for example bags lashed to a support such as a chipboard. Vehicles are another example of not standardized freight items that must be transported. The relative high weight of these freight items impose high requirements regarding the static and dynamic forces and moments that must be taken up by the structures of the loading floor and by the load lashing positions, each comprising an individual lashing device. It may also be required to satisfy special conditions for special missions such as the transporting of medical supplies and medical units. In addition to satisfying all strength and regulation requirements the change-over or retooling must be realized within a minimum of time by a minimum of service personnel.

Conventional systems use passenger seats mounted on pallets for carrying of passengers, whereby the pallets are secured to the loading floor. If the aircraft is to be used for transporting freight, the seat carrying pallets must be removed and conventional function elements or units must be made available for the freight transport. Such function elements or units include, for example lashing positions, roller units, latching or interlocking devices, guide rails and the like so that other pallets, containers or other freight items can be secured to the loading floor instead of the passenger seat carrying pallets.

It is conventional to mount seats and other load systems directly and alternatively to the loading floor. However, additional mounting possibilities are required for this purpose. Conventionally, mounting rails or lashing positions are provided as mounting interconnections in such a way that either passenger seats or the above mentioned function elements of the freight loading system can be secured to the loading floor. FIG. 1 shows such a system. Lashing devices with lashing rings are located in predetermined positions for lashing of freight items to the loading floor or deck. A multitude of lashing positions are usually provided and uniformly distributed at equal spacings on or in the loading floor in the loading space. The individual lashing device is generally secured directly to the aircraft supporting frame structure in order to be able to take up large forces and moments in all directions of space. If it becomes necessary that the lashing devices or lashing positions of a freight loading system must additionally be useful for the securing of other components or systems, the lashing devices must be either completely replaced or partially dismantled and supplemented. Such operations are time consuming and have the disadvantage that individual elements of the lashing devices can get lost.

OBJECTS OF THE INVENTION

In view of the foregoing it is the aim of the invention to achieve the following objects singly or in combination:
 to construct a lashing device in such a manner that it can be rapidly converted from a lashing position or device to an interlocking or latching position or device for the securing of any type of goods;
 to construct the lashing device so that it will readily accept an interconnection element for the latching of other functional components such as passenger seats, roller tracks, medical supply units such as stretchers, and further function elements; and
 to permit the conversion from freight lashing to freight latching and vice versa in a minimum conversion time by a minimum of service personnel.

SUMMARY OF THE INVENTION

A lashing device for securing a load to a loading floor in a transport conveyance, particularly in an aircraft, is characterized according to the invention by the following features. The lashing device has a base, a lashing bail journaled with a journal pin to the base for tilting the lashing bail from a recessed position to an operating position and vice versa. The base comprises at least one mounting for securing or holding an interconnecting element in place when the lashing bail is in its recessed position. Preferably, the mounting in the base is a socket in which an interconnecting element can be locked in place, for example by a locking bolt. Preferably, a tilting angle of the lashing bail relative to the vertical is just sufficient to make the socket for the interconnecting element accessible and to not interfere with any latching operations.

It is an advantage of the invention that the present lashing device enables a simple, reliable and flexible change-over in the freight loading system from passenger transport to the transport of any type of freight items. Changes and adaptations to client's wishes can be made rapidly without any new special developments to satisfy customer desires or at least any structural changes can be rapidly made in accordance with customer wishes at a minimum of additional investment. The repositioning of the lashing bail between its recessed position and its upright operating position and vice versa is quickly made. As a result the insertion of an interconnecting element into a socket in the base of the lashing device and the locking in the socket is easily accomplished. The interconnection element can serve for its intended purpose for the locking or latching of other components or systems to the floor. Weight reduction considerations have been taken into account because the conversion from a lashing operation to a latching operation requires a single additional interconnecting element.

BRIEF DESCRIPTION OF THE DRAWINGS

In order that the invention may be clearly understood, it will now be described in connection with example embodiments thereof, with reference to the accompanying drawings, wherein:

FIG. 2 illustrates a perspective view of a lashing device according to the invention with the lashing bail shown in its upright operating position;

FIG. 3 shows a front view of the present lashing device with the latching bolt removed;

FIG. 3A is a side view of the device of FIG. 3 with the latching bolt in position;

FIG. 4 is a perspective view of a modified lashing device with the lashing bail in its recessed position;

DETAILED DESCRIPTION OF A PREFERRED EXAMPLE EMBODIMENT AND OF THE BEST MODE OF THE INVENTION

Figure 1:
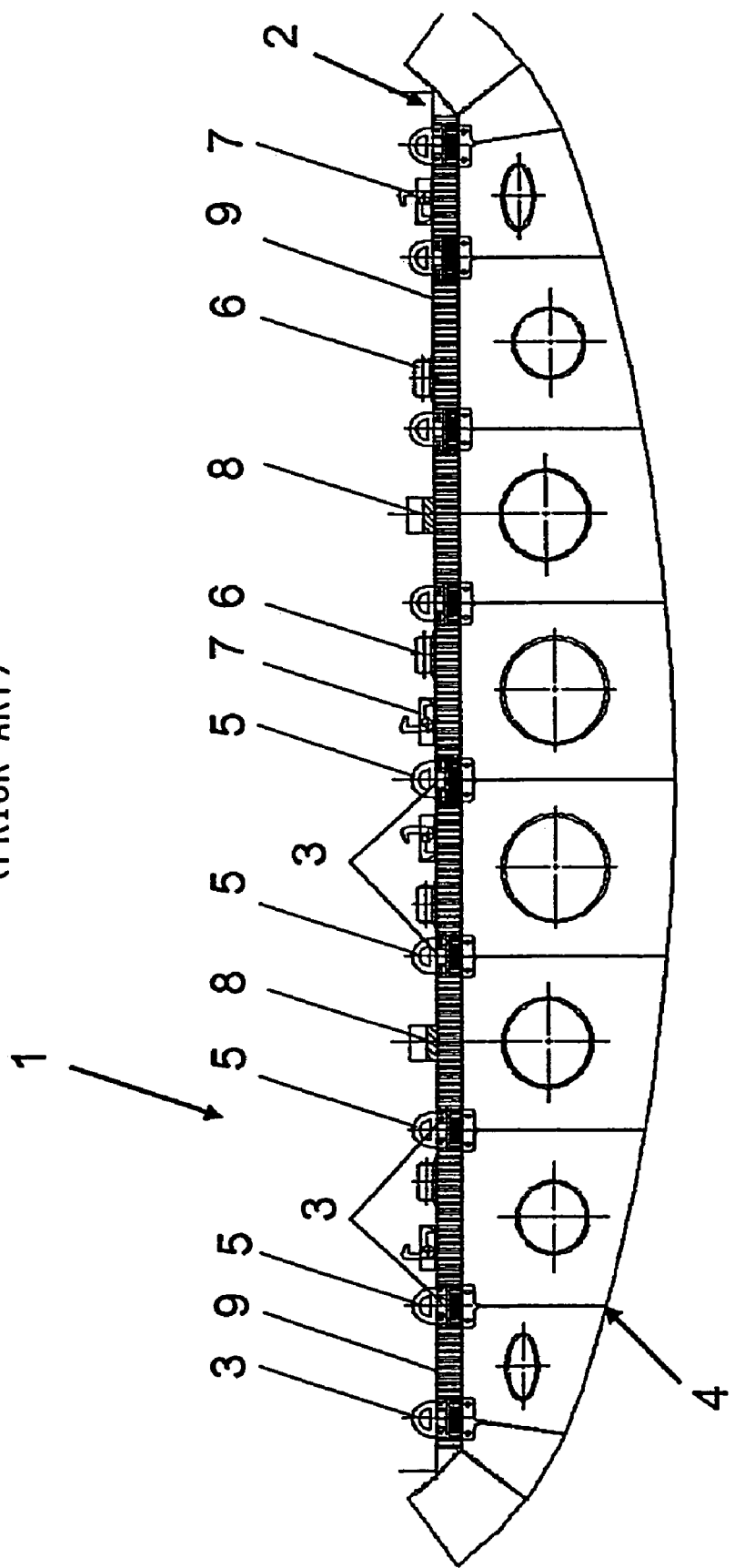
FIG. 1 is a sectional view through a loading floor of a freight deck in an aircraft according to the prior art.

FIG. 1 shows a sectional view through a conventional aircraft deck 1 formed by a loading floor 2. If an aircraft must carry passengers, pallets carrying passenger seats are mounted to the aircraft deck 1. If the aircraft is intended for transporting freight items, as shown in FIG. 1, the pallets and seats mounted thereon are removed, whereby conventional function units installed in or on the deck 1 become accessible. Such conventional function units include lashing points or lashing devices 3 with lashing rings 5, roller systems 6, latching or locking elements 8 and guide rails 7. As a result, freight pallets or containers loaded with freight can be secured to the floor 2 instead of seat carrying pallets. Numerous lashing points or rather lashing devices 3 are mounted to the aircraft deck 1 formed by the loading floor 2, whereby these lashing devices are uniformly spaced from one another throughout the deck 1 in the loading space. The just mentioned function elements are generally secured directly to an aircraft frame structure 4 such as a rib or spar, whereby the lashing rings 5 can take up substantial static forces and moments.

Seats and other systems such as medical supply units including carrying stretchers and further guide or latching rails 7 can be alternatively mounted directly to the aircraft deck 1 which in turn is mounted to the aircraft frame structure. However, for this purpose additional mounting possibilities are required or the lashing devices 3 constructed for taking up large forces, must be retooled. Such retooling may involve, for example, the removal of the latching rings 5 which is time consuming.

FIG. 2 is a perspective view of one embodiment of a lashing device 10 including a lashing bail 11 and a base 14 with base side walls 14A provided with mounting holes 20 and a journal bore 15 holding a journal pin 16 having a journal axis 17. The base 14 comprises a support surface 26 for cover or top plates 33 shown in FIG. 5. The cover plates 33 are preferably equipped with mounting rail profiles 34 to be described in more detail below with reference to FIGS. 5 and 6. Flathead screws, not shown, fit through mounting holes 19 for securing the base 14 to a lashing channel 18, shown in FIG. 5, and to the frame 4. Holes 27, preferably threaded, serve for securing a cover plate to the support surface 26. A flow passage 21 open downwardly toward the bottom of a lashing channel 18 is provided in the base 14 for drainage or heating purposes. The passage 21 may have rounded corners as shown in FIG. 2 or squared corners, if desired. A further flow passage may be formed by a bevel 21' along the bottom edges of the base 14. However, these bevels 21' may be omitted. Both side walls 14A of the base 14 have the same features, namely mounting holes 20 and a journal bore 15 for holding the journal pin 16.

A mounting block MB is centrally positioned between the sidewalls 14A of the base 14 and between the support surfaces 26 only one of which is seen in FIG. 2. The mounting block MB has a recess or socket 23 surrounded by block walls. Short block side walls are spaced from the base sidewalls 14A to form two spaces in which legs 12 and 13 of the lashing bail 11 are journaled by journal pins 16 which extend through the base sidewalls 14A, through the legs 12 and 13 of the bail 11 and through the short block side walls of the mounting block MB. The journal pins 16 are axially aligned with each other and relative to the journal axis 17, but these journal pins 16 do not extend through the recess or socket 23 which is intended to receive an interconnecting member 36 as will be described in more detail with reference to FIG. 5. A bore 24 passes through the long side walls of the mounting block MB for receiving a locking bolt 25 that will also pass through the interconnecting element 36 inserted into the recess 23 when the lashing bail 11 is tilted into a recessed position shown in FIG. 4, thereby locking the interconnecting element 36 in the socket 23.

Referring further to FIG. 2, the mounting bail 11 comprises a ring portion 5 and the above mentioned legs 12 and 13 that are journaled to the base 14 by the journal pins 16 as described above. The mounting bail 11 is reinforced by a crosspiece 5' interconnecting the legs 12 and 13 for an improved mechanical strength. At least one reset spring 37 is positioned and effective between the base 14 or mounting block MB and at least one leg 13 of the lashing bail 11 so as to maintain the lashing bail 11 in a recessed position as shown in FIG. 4. When the lashing bail 11 is tilted into the recessed position where it is held by the force of the reset spring 37, the lashing bail 11 will retain its recessed position until intentionally moved back into the working position shown in FIG. 2. When the bail 11 is in the recessed position the recess 23 is accessible for inserting the interconnecting element 36.

FIG. 3 and FIG. 3A show a somewhat modified embodiment of a lashing device 10A. The lashing bail 11 again comprises a ring portion 5 and two legs 12 and 13 interconnected by a crosspiece 5'. The base is a relatively flat base 28 without any side walls, but with lateral flanges 28' seen in FIG. 3A, through which the base 28 is connectable to a flat support such as a frame 4 or a loading floor. The flat base 28 can even be integrated into a floor section or floor panel. Screw holes or screws 19 are provided for connecting the base 28 to the frame 4 or floor. The holes or screws 19 pass through the lateral flanges 28'. A central raised portion of the base 28 is provided with a receptacle or socket 23 as in the first embodiment shown in FIG. 2, for the attachment of an interconnecting element 36 shown in FIG. 5. A locking bore 24 passes through the central, raised portion of the base 14 to receive a locking bolt 25 seen in FIG. 3A. Further, the base 28 is provided with lateral mounting blocks MB for journaling the legs 12 and 13 of the bail 11 to the base 28 by two journal pins 16. These mounting blocks MB are provided with recesses in which the legs 12 and 13 are received. The recesses have through holes 15 in which journal pins 16 are received, whereby the bail 11 can be tilted about a journal axis 17 from the recessed position shown in FIG. 4 to the raised or working position shown in FIG. 2 and vice versa. The screw holes 19 pass through the flanges 28' outside of the central mounting portion of the base 28.

Further, the base 28 is provided with a channel 21 having rectangular corners and extending entirely through the bottom of the base so that a drainage passage is formed for water and for cleaning purposes or for flowing heating air. Thus, the lashing device 10 of FIGS. 3 and 3A is also easily cleaned since cleaning liquid can flow through the channel 21.

FIG. 4 shows a modified lashing device 10B. The lashing bail 11 is constructed as described above with reference to FIG. 2. However, the base 28 of FIG. 4 does not have a drainage or flow passage 21 and the recess 23 in the mounting block MB has a circular cross-section rather than a rectangular cross-section, for receiving an interconnecting element also having a circular cross-section. In both instances the interconnecting element will be held in place by the locking bolt 25. The lashing bail 11 is shown in a recessed position in FIG. 4 as compared to the working position shown in FIG. 2. Incidentally, rather than making the recess 23 rectangular or circular in its cross-section, other cross-sectional configurations can be provided, for example a square cross-sectional configuration to receive square posts for interconnection to other components of the loading system when the lashing bail 11 is in the recessed position.

It is not absolutely necessary that the base 14 has side walls 14A. Where it is sufficient to mount the lashing devices 10 through the bottom of the lashing channel 18 to the supporting frame structure, it may not be necessary to also secure the lashing devices 10 to floor panels (not shown). Thus, no lateral mounting screw holes 20 are necessary and hence no base sidewalls are necessary. Similarly, the flow passage 21 is needed only where contamination with liquids such as water is expected. However, lateral flanges 28' for the mounting of the journal pins 16 are required.

Figure 5:
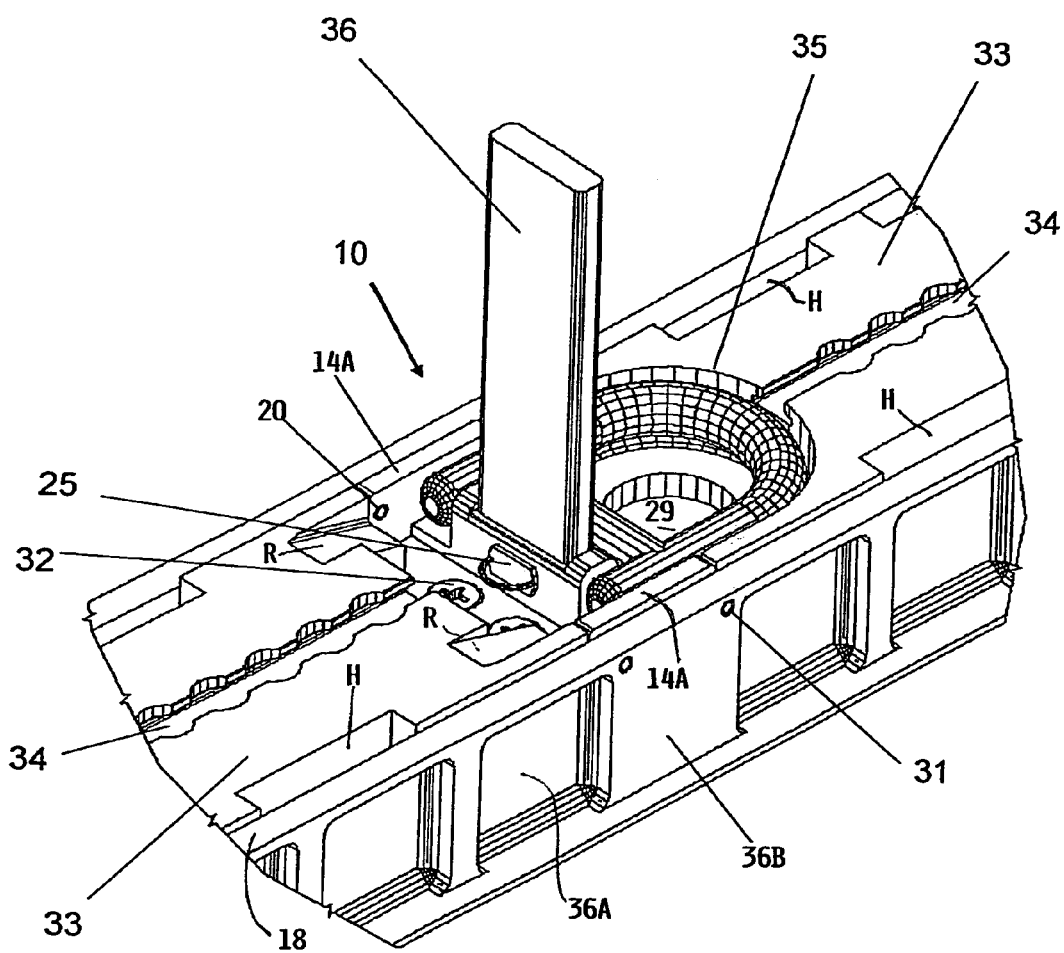
FIG. 5 is a perspective view of a lashing device according to the invention mounted in a lashing channel as disclosed in copending application 10/859,443 filed Jun. 1, 2004, with an interconnecting element secured in a socket in the base of the present lashing element.

FIG. 5 shows on an enlarged scale the insertion of an interconnecting element 36 into the recess or socket 23. The interconnecting element 36 is locked in place by the locking bolt 25 provided with a handle for easy insertion and withdrawal. In addition to the water inlet holes H in the cover or top plates 33 ramps R may be provided at the ends of the cover plates 33 next to the lashing devices 10 to facilitate water flow down into a lashing channel 18 for proper drainage through flow passages 21 mentioned above. The lashing devices are installed in the lashing channels 18 as described in abovementioned U.S. application Ser. No. 10/859,443. FIG. 5 also shows that weight reductions are achieved by recesses 36A in the side walls of the channel 18. The recesses 36A are so positioned and dimensioned that intermediate lands 36B have a sufficient size for mounting holes 31 which are aligned with mounting holes 20 in the base 14 to secure the lashing devices 10 to the lashing channel 18 and to floor panels, not shown. The channel cover or top plates 33 are preferably provided with holes 29 for drainage into the channel 18. Further, the plates 33 have preferably a profile 34 for the interlocking with other loading system components. The holes 29 are preferably positioned within a recess 35 of the plates 33 into which the bail 11 can be recessed.

Figure 6:
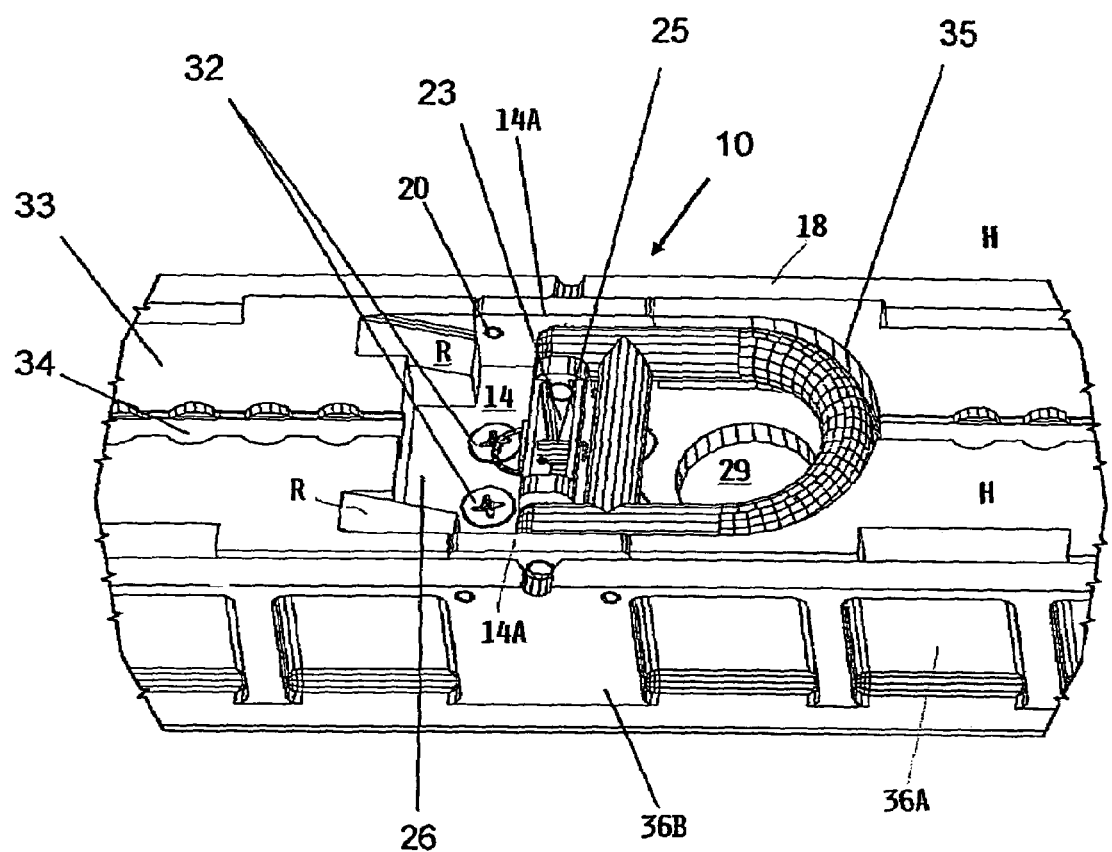
FIG. 6 is a view similar to that of FIG. 5, however illustrating the lashing device with the interconnecting element removed from its socket.

FIG. 6 is a view similar to that of FIG. 5, however showing the mounting recess or socket 23 in the base 14 without an interconnecting element. The socket 23 has a rectangular cross-sectional configuration.

Figures 7, 7A:
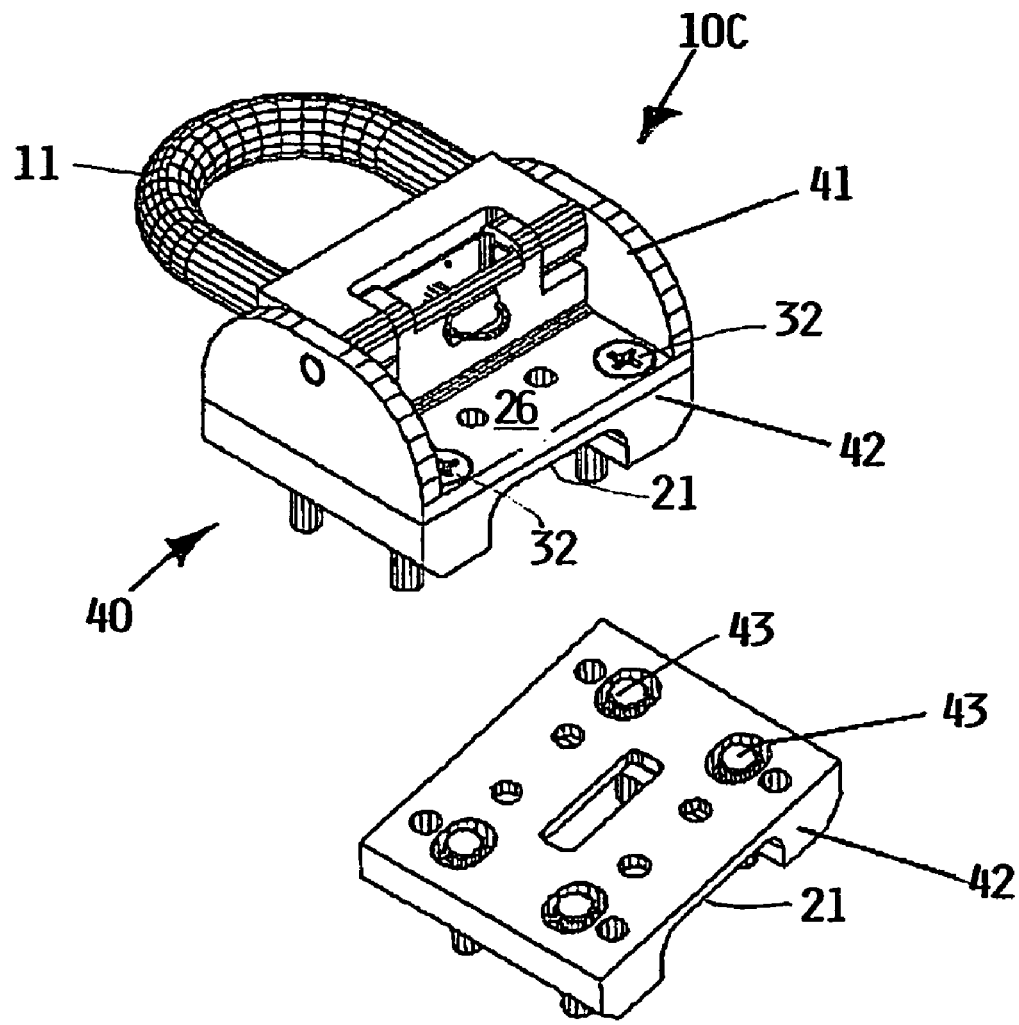
FIG. 7 shows a perspective view of a further embodiment of the present lashing device with a divided base.
FIG. 7A shows a perspective view of a base bottom of the divided base.

FIGS. 7 and 7A show perspective views of a further embodiment of a lashing device 10C according to the invention. The lashing device 10C has a bail 11 journaled as described above to a base 40 that is divided into an upper base block 41 and a lower base block 42. Either the upper or the lower base block 41, 42 has enlarged mounting holes 43 for permitting a positional adjustment of the lashing device 10C relative to a lashing channel 18 and/or a support frame 4. The enlarged mounting holes may also or alternatively be provided in the frame 4. Nuts and bolts with washers may be used for locking the lashing device 10C to the support 4 or channel 18 once the device 10C is in the proper position.

The features of the embodiment of FIGS. 7 and 7A have the advantage that manufacturing tolerances in the cooperating components are readily accommodated. Such components include the lashing channel, the frame 4, the base 14 or 40. The adjustment of the position of the lashing device 10C relative to other components has the advantage that the lashing device can be precisely installed in spite of acceptable manufacturing tolerances. This feature also facilitates locating the socket 23 in a position where insertion of the interconnecting element 36 is simple, yet precise. The larger or elongated holes 43 permit an adjustment in the X- and Y-direction. An adjustment in the Z-direction is accomplished by inserting thin sheet metal spacers between the upper base section 41 and the lower base section 42.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A lashing device for securing a load to a loading floor in a transport conveyance, said lashing device comprising a base, a lashing bail, and a journal pin tiltably securing ends (12, 13) of said lashing bail to said base so as to enable tilting of said lashing bail from a recessed position to an operating position and vice versa, wherein said base comprises at least a one mounting (23) adapted to hold an interconnecting element (36) in place, and said base further comprises a bottom and a flow passage (21, 21') formed in said bottom.

2. The lashing device of claim 1, wherein said lashing bail is tiltable about a journal axis of said journal pin through an angle sufficient so that said mounting (23) is accessible to receive and hold said interconnecting element (36) to said base when said lashing bail is in said recessed position.

3. The lashing device of claim 2, wherein said angle is 90° between said recessed position and said operating position of said lashing bail.

4. The lashing device of claim 1, further comprising a lashing spring (37) that is operatively connected to said base and to said lashing bail and that spring-biases said lashing bail toward said recessed position wherein said mounting (23) is accessible.

5. The lashing device of claim 1, wherein said mounting (23) is a socket in said base adapted to receive said interconnecting element (36) inserted into said socket.

6. The lashing device of claim 5, wherein said socket (23) and said interconnecting element (36) have a cross-bore (24), and said lashing device further comprises a locking bolt (25) that extends through said cross-bore and latches said interconnecting element (36) in said socket (23).

7. The lashing device of claim 1, wherein said base further comprises mounting bores adapted to secure said lashing device to a support.

8. The lashing device of claim 7, wherein said base further comprises lateral walls and wherein said mounting bores comprise through holes in said lateral walls adapted to secure said lashing device with said base in a lashing channel.

9. The lashing device of claim 1, wherein said base further comprises a mounting surface adapted to secure a cover plate to said base.

10. The lashing device of claim 9, wherein said mounting surface comprises at least one of a through hole and threaded bore.

11. The lashing device of claim 9, wherein said cover plate is an adapter plate with a mounting rail profile (34) adapted to secure function components to said base when said lashing bail is in said recessed position.

12. The lashing device of claim 1, wherein said base comprises an upper base block, a lower base block, and at least one position adjustment as part of at least one of said upper base block and said lower base block.

13. The lashing device of claim 12, wherein said position adjustment comprises a number of enlarged holes.

14. The lashing device of claim 13, wherein said enlarged boles are elongated holes.

15. The lashing device of claim 5, wherein said socket passes through said base and opens into said flow passage to enable liquid drainage from said socket to said flow passage.

16. A lashing device for securing a load to a loading floor in a transport conveyance, said lashing device comprising a base, a lashing bail, and a journal pin tiltably securing ends (12, 13) of said lashing bail to said base so as to enable tilting of said lashing bail from a recessed position to an operating position and vice versa, wherein said base comprises at least one mounting (23) adapted to hold an interconnecting element (36) in place, and said base further comprises lateral walls having through holes therein adapted to secure said lashing device with said base to a support comprising a lashing channel.

17. A lashing device for securing a load to a loading floor in a transport conveyance, said lashing device comprising a base, a lashing bail, a journal pin tiltably securing ends (12, 13) of said lashing bail to said base so as to enable tilting of said lashing bail from a recessed position to an operating position and vice versa, and a cover plate, wherein said base comprises at least one mounting (23) adapted to hold an interconnecting element (36) in place, said base further comprises a mounting surface adapted to secure said cover plate thereon, and said cover plate is an adapter plate having a mounting rail profile (34) adapted to secure function components to said base when said lashing bail is in said recessed position.

18. A lashing device for securing a load to a loading floor in a transport conveyance, said lashing device comprising a base, a lashing bail, journal pins pivotally securing ends (12, 13) of said lashing bail to said base to enable said lashing bail to pivot about a journal axis of said journal pins between a recessed position and an operating position of said lashing bail relative to said base, and an interconnecting element, wherein said base defines therein a socket into which said interconnecting element can be removably and securably inserted, said interconnecting element is a post having a post end configured to be inserted and received in said socket and a post body that protrudes from said base along a socket axis of said socket, said journal axis extends transversely through said socket, and said journal pins do not extend into a clear crosssection of said socket adapted to receive said interconnecting element therein.

* * * * *

UNITED STATES PATENT AND TRADEMARK OFFICE
CERTIFICATE OF CORRECTION

| | | |
|---|---|---|
| PATENT NO. | : 7,086,815 B2 | Page 1 of 1 |
| APPLICATION NO. | : 10/859437 | |
| DATED | : August 8, 2006 | |
| INVENTOR(S) | : Bruns | |

It is certified that error appears in the above-identified patent and that said Letters Patent is hereby corrected as shown below:

Title page,
Item [56], References Cited, U.S. PATENT DOCUMENTS,
Line 2, after "6/1975", replace "Biggs" by --Bigge--;

Column 6,
Line 59, after "least", delete "a";

Column 7,
Line 42, before "are", replace "boles" by --holes--;

Column 8,
Line 42, before "of", replace "crosssection" by --cross-section--.

Signed and Sealed this

Thirteenth Day of March, 2007

JON W. DUDAS
*Director of the United States Patent and Trademark Office*